United States Patent [11] 3,613,055

[72] Inventors Andrew G. Varadi
85-15 Main St., Jamaica, N.Y. 11435;
Richard B. Rubinstein, 245 E. 19th St.,
New York, N.Y. 10003

[21] Appl. No. 887,496
[22] Filed Dec. 23, 1969
[45] Patented Oct. 12, 1971

[54] READ-ONLY MEMORY UTILIZING SERVICE COLUMN SWITCHING TECHNIQUES
6 Claims, 4 Drawing Figs.

[52] U.S. Cl. .......... 340/173 SP, 340/174 SP
[51] Int. Cl. .......... G11c 17/00
[50] Field of Search .......... 340/173 SP, 174 SP, 173 R

[56] References Cited
UNITED STATES PATENTS
3,069,665 12/1962 Bobeck .......... 340/173

*Primary Examiner*—Terrell W. Fears
*Attorney*—James and Franklin

ABSTRACT: A read-only memory comprises first and second sections each of which contains a data-storing matrix. For each data readout operation each matrix is simultaneously addressed and one of the sections is selected. The output line of the unselected section is unconditionally charged to a reference potential. That potential is selectively transferred to an output circuit through a first switch controlled by a data signal derived at the output line of the selected memory section, and that reference potential simultaneously actuates a second switch to transfer the data signal from the selected column output line to the output circuit, thereby to achieve a more rapid retrieval of data from the memory.

INVENTOR
ANDREW G. VARADI
RICHARD B. RUBINSTEIN
BY
Sandoe, Hopgood & Calimafde
ATTORNEYS INVENTOR
ANDREW G. VARADI
RICHARD B. RUBINSTEIN
BY
Sandoe, Hopgood & Calimafde
ATTORNEYS INVENTOR
ANDREW G. VARADI
RICHARD B. RUBINSTEIN
BY Sandoe, Hopgood & Calimafde
ATTORNEYS

READ-ONLY MEMORY UTILIZING SERVICE COLUMN SWITCHING TECHNIQUES

The present invention relates generally to memories, and particularly to read-only memories.

Read-only memories are among the basic components of almost all general and special purpose digital computers. In these memories, data is initially and permanently stored at the time the memory is fabricated. One application for memories of this type is to store program data to control the operation of the computer in response to the addressing of the read-only memory.

As in most memories, the basic considerations in their design is their cost, capacity per unit volume, and the rate at which data can be retrieved or "read out" from the memory after it is addressed. It is, of course, essential in most read-only memories that the stored data be nondestructive in nature, that is, a readout operation on the memory should not destroy or erase the data stored at the addressed location in the memory.

Various types of read-only memories are presently known including core and thin-film memories. Recent developments in semiconductor fabrication techniques, including large-scale integration (LSI) techniques, permit the formation of multiplicity of devices, such as insulated gate-type MOS, field-effect transistors (FETS) on a single and relatively small chip or wafer. It has been proposed to utilize FETS in the design of a read-only memory as disclosed in a copending application in the name of Andrew G. Varadi, Ser. No. 791,759, filed on JAN.16 1969, entitled *Read-Only Memory*. In that memory the address locations in the memory are defined by the intersection of a plurality of rows and columns. AT those intersections at which a predetermined data bit, e.g., logic "1, " is to be stored, an operation FET is formed; at other intersections at which the other data bit, e.g., logic "0," is to be stored, no such device is formed. Upon the addressing of the memory, the presence of a device at the addressed location forms a conductive path to cause a data signal of one sense to appear at the output node of the memory. If a device were not present at that location, no conduction path would be established, and a data signal of an opposite sense would then be present at the data output node.

While this read-only memory offers significant advantages over many of the prior art memories, including increased storage capacity and reduced power drain, there remain difficulties and drawbacks in that memory of which the most significant is the time required to transfer or read out a stored data bit to the memory output. This data retrieval time, as stated above, constitutes a significant feature in the design of such memories, particularly when the memory is to be used in a modern, high-speed digital computer.

The major cause for this relatively high retrieval time in the known FET read-only memories is believed to be the capacitance defined at the column lines which introduces a time delay in the propagation of the data signal to the memory output. As the data storage capacity of the memory is increased so does that capacitance, as the member of columns in the memory is increased to accommodate the additional data storage locations. Thus, the memory designer must often sacrifice data storage capacity to achieve an optimum data retrieval time which is consonant with the speed requirements of the computer.

Yet another drawback of the known FET read-only memories results from the occasional imperfections in fabricating the devices at the data storage locations. An operative FET formed to store a logic "1" is formed by creating a gate region intermediate two adjacent columns which define the source and drain regions for that device. However, the possibility remains that a location at which no device is intended may experience some conduction between the adjacent channels which in turn may be reflected at the memory output as an erroneous logic "1" data signal. This is clearly an intolerable situation. As a result, great precision of fabrication with its attendant increased costs must be employed in the fabrication of these memories to ensure the required degree of accuracy. This factor mitigates against the use of these memories since, as stated above, cost is an important factor in selecting which type of memory is to be used in a computer.

It is, therefore, a general object of the present invention to provide an improved LSI read-only memory having a shorter data retrieval time.

It is a further object of the present invention to provide a read-only memory fabricated by LSI techniques in which the required tolerances and thus the fabricating costs are reduced.

The memory of the present invention comprises a pair of memory sections each of which contains a matrix at which a plurality of logic bits of either a logic "1" or logic "0" level are permanently stored at selected address locations. A particular memory location is addressed by providing row, column and section select signals. The first two select a common address location in each memory section and the last signal selects the section from which the data stored at that location is transferred to a memory output, while inhibiting data readout from the other, or unselected section. The separation of the memory into two sections significantly decreases the capacitive loading on an output amplifier, and thus increases the response time of that amplifier to a readout data signal without reducing the data storage capacity of the memory.

The output bus of the unselected section is unconditionally charged to a reference, e.g., negative, potential, and the output bus of the selected memory section is charged to one of two discrete levels corresponding to the stored data at the addressed location therein. The former (unselected) output bus is connected to the control terminal of a first switching device and the latter (selected) output bus is connected to one output terminal of that switching device. The other output terminal of the first switching device is connected to the input of the output amplifier. The control terminal of a second switching device is connected to the output bus of the selected memory section and its output circuit is connected between the negatively precharged output bus of the unselected memory section and the input of that amplifier.

In the embodiment of the memory herein described a negative data signal at the selected memory section causes the second switching device to be conductive to cause the negative precharged potential at the unselected memory section to be transferred through the switching device to the input of the output amplifier. In addition the negative signal at the unselected column causes the first switching device to conduct, thereby operatively connecting the selected section output bus to the output amplifier. Thus, for a negative, e.g., logic "1" signal, both switching devices are actuated to cause current to flow at an increased rate to the output amplifier, thereby significantly increasing the rate at which a logic "1" data signal is read out or retrieved from the memory.

In another feature of the invention a current bypass device is provided on the output bus of each memory section to conduct a predetermined, relatively small amount of current to ground whenever the output bus goes sufficiently negative below a threshold level. This prevents leakage or noise current in the memory from erroneously being sensed as a logic "1" data signal during a logic "0" readout operation. For a logic "1" data signal, the current at the selected section output bus exceeds the current capacity of the bypass device and is thus sufficient to actuate the switching device and the output amplifier as desired.

To the accomplishment of the above and to such other objects as may hereinafter appear, the present invention relates to a read-only memory as defined in the appended claims and as described in the following specification taken together with the accompanying drawings in which:

Figure 1:
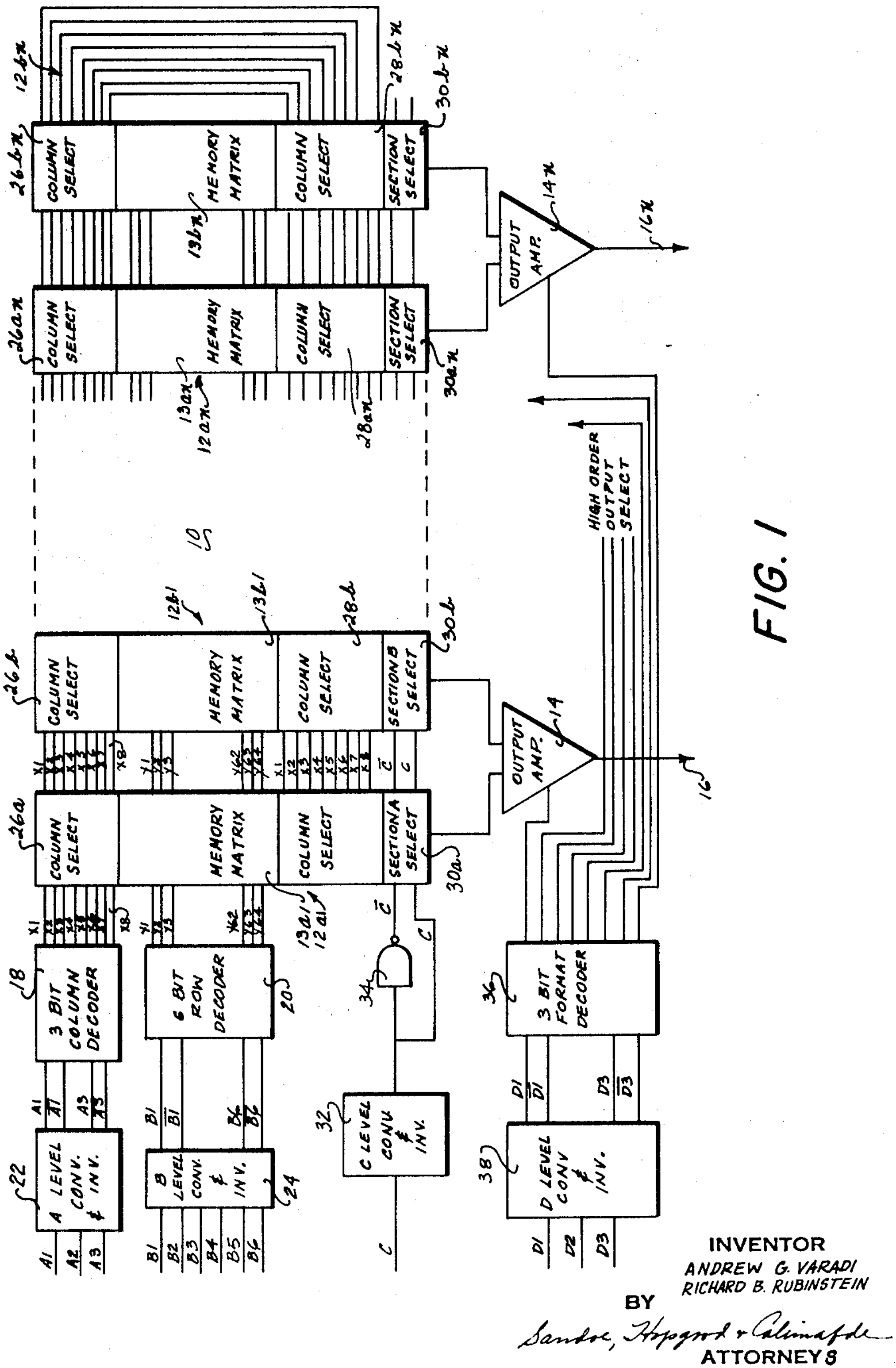
FIG. 1 is a schematic block diagram of a read-only memory of the present invention.

The read-only memory of the present invention, generally designated 10, is here shown as a combination of pairs of memory sections **12*a* and 12*b*, only two of such pairs 12*a*1 and 12*b*1, and 12*an* and 12*bn* being shown in FIG. 1. Each memory section 12*a*,*b* respectively comprises a matrix 13*a* and 13*b* in which a plurality of address locations at which logic bits are permanently stored at one of two possible discrete values, corresponding respectively to the storage of a logic "1" or logic "0" bit. The data pattern in each matrix is preferably different, although it is conceivable that two or more of the matrices may have identical data storage patterns, if desired. The outputs of each pair of memory sections 12 is connected to the input of an output amplifier 14 having an output line 16** at which the data output signal from its associated selected memory section is produced as a result of a readout operation on the memory as will be more fully described below.

The memory further comprises suitable addressing circuitry including a column decoder 18 and a row decoder 20 which receive suitable input select signals derived respectively from column and row inverters 22 and 24, which in turn respectively receive the input column and row select signals A and B. In a typical read-only memory as herein described, each memory matrix comprises 512 bits or address locations defined at the intersections of eight columns and 64 rows. Thus three column select signals A1, A2, and A3 need be applied to inverter 22 which produces the trues and complements of those signals. Similarly six row select signals B1–B6 are applied to inverter 24 which similarly produces the trues and complements of those signals.

Column decoder 18 processes the trues and complements of the column select signals to derive output signals $x_1$–$x_8$ one of which, that is the one corresponding to the selected column, is uniquely of one sense e.g., negative) while the others are of an opposite sense e.g., positive or ground). Similarly two decoder 20 produces row decode signals $y_1$–$y_{64}$ one of which is uniquely negative corresponding to the row location of the selected address location, the other row decode signals being either positive of ground.

The column select signals $x_1$–$x_8$ are applied, in a manner more completely described below, to upper column select circuits **26*a* and 26*b* and to lower column select circuits 28*a* and 28*b*, in each pair of memory sections. The row select signals $y_1$–$y_{64}$ are applied to the data storage matrices in each memory section 12**.

An output signal at one of two levels, corresponding to the stored data at the selected address location in each matrix, is produced at the output of each of the memory sections 12. Section select circuits 30 and **30*a* receive section signals C and $\bar{C}$ derived from a level converter 32 and an inverter 34, the former receiving an input section select signal C and the latter forming the complement of that signal. The section select signals are effective in a manner more completely described below, to inhibit the output of one of the memory sections in each pair of sections by unconditionally placing the output bus of that section at a level of one sense, while connecting the output of the other memory section in the pair to the input of amplifier 14**.

In the read-only memory herein shown there are eight pairs of memory sections ($n$=8), so that each of amplifiers 14 has an output signal corresponding to the selected address location in the memory section pair connected thereto. To select a desired one or a plurality of output signals from amplifiers 14, format select signals Z1–Z8 are derived from a format decoder 36. Decoder 36 receives the trues and complements of the D1, D2, and D3 format select signals which are first applied to a level converter 38. Format signals Z1–Z8 are applied respectively to each of the output amplifiers 14 to control their outputs, that is, to disable those amplifiers from which no data signal is desired. The resultant output signal from the memory is thus either one or a predetermined combination of bits derived from selected ones of amplifiers 14.

Figure 2:
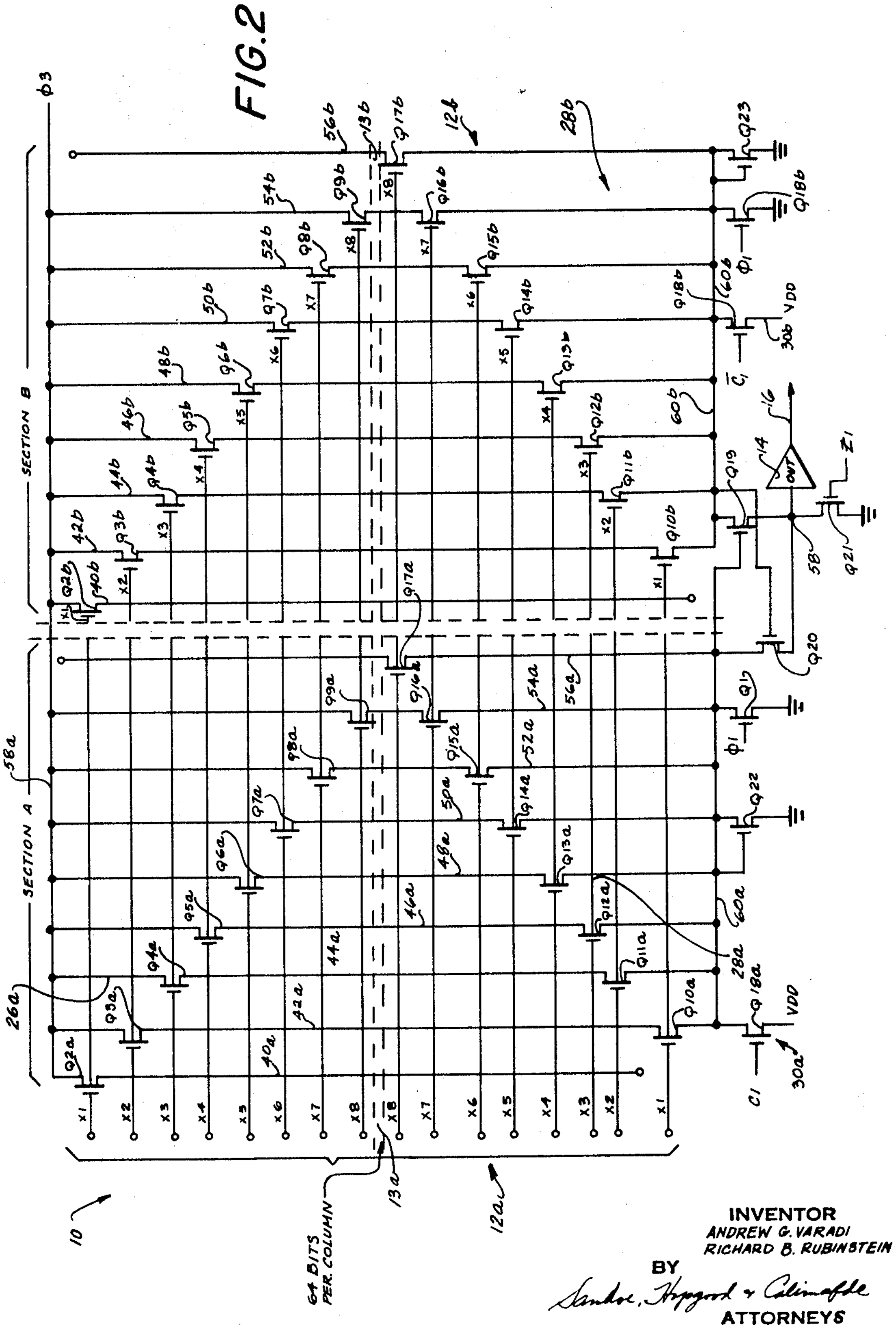
FIG. 2 is a more detailed schematic diagram of two adjacent sections of the memory of FIG. 1.

FIG. 2 illustrates schematically the address and select portions of two sections **12*a* and 12*b* of memory 10**, the 512-bit memory matrices being represented between the horizontal broken lines in the figure. As noted above those memory matrices are preferably generally of the type described in said copending application, and comprise a plurality of P-type column channels formed in an N-type substrate between which an operative gate region is either fabricated or not along the rows of the matrix, depending on the logic level of the bit that is to be stored at that row-column intersection. At those regions at which there is an operative gate region, a potentially operative field effort transistor (FET) is formed, with the two adjacent P-type channels serving as the source and drain regions for that device. The presence of an operative FET at an address location may define a stored logic "1" bit while the absence of an operative FET at an address location defines a stored logic "0" bit.

Since the addressing and output circuitry of each memory section is substantially the same, the circuitry of only one section is specifically described herein, it being understood that that description applies equally to the corresponding circuitry of the other memory section. Each section, as noted above, comprises eight memory storage columns defined by nine P-type channels **40*a*–56*a* extending through the memory matrix and through upper and lower column select circuits 26*a* and 28*a***. As noted above these channels define eight possible operative FET's within the matrix depending on the formation of an operative gate region between any adjacent pair of these columns.

Figure 3:
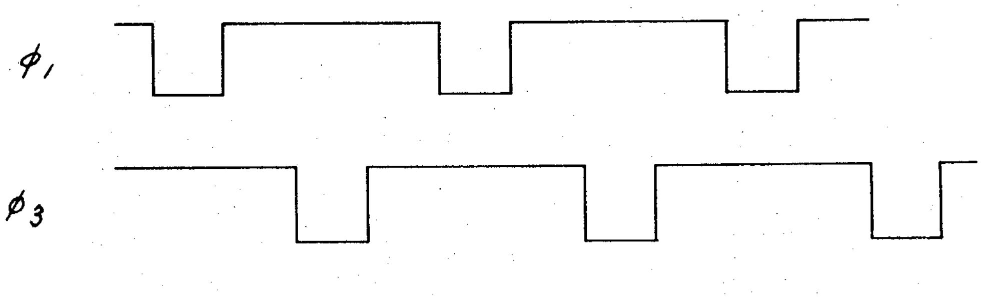
FIG. 3 is a timing diagram of some of the four-phase clock signals used in the operation of the memory.

Channels **40*a*–54*a* are connected at their upper ends to an input bus 58*a*, and channels 42*a*–56*a* are connected at their lower ends to an output bus 60*a*. The output circuit of FET Q1 is connected between bus 60*a* and ground and its gate receives the $\phi 1$ clock. FET Q1 is conductive during $\phi 1$ time, that is, the time during each four-phase cycle when the $\phi 1$ clock is negative (FIG. 3). Bus 58*a*** is tied directly to the $\phi 3$ clock and is thus charged negative during each $\phi 3$ time.

In upper column select circuit **26*a*. FET's Q2–Q9 have their output circuits respectively connected in series with channels 40*a*–54, and in lower column select circuit 28*a*FET's Q10–Q17 have their output circuits respectively connected in series with channels 42*a*–56*a*. With the exception of the first and ninth channels 40*a*and 56*a*, each of the channels has a pair of FET's connected in series therewith, one FET being so connected in the upper column select circuit 26*a*, and the other FET being so connected in the lower column select circuit 28*a*. The gates of FET's Q2–Q9 in circuit 26*a* respectively receive the column select signals $x_1$–$x_8$ only one of which is negative, and those same column select signals are respectively applied to the gates of FET's Q10 –Q17 in circuit 28*a*. The gate regions of the 64** possible operative FET's defined between each adjacent pair of channels in the memory matrix respectively receive the row select signals $y_1$–$y_{64}$.

In operation bus **60*a* is charged to ground through FET Q1 during $\phi 1$ time, and bus 58*a* is charged negative during $\phi 3$ time at which time the row and column select signals derived from decoders 20 and 18 have been stabilized. For the selected column a pair of FET's receiving the negative column select signal are rendered conductive, those FET's being located in adjacent channels, one in the upper column select circuit 26*a* and the other in the lower column select circuit 28*a*. Thus the two adjacent channels receiving the uniquely negative column select signal are connected during $\phi 3$ time to a negative voltage supply at bus 58*a* and ground at bus 60*a*** and thereby define the source and drain regions of a potentially operative FET at each of the 64 rows in the memory matrix.

If there is an active FET gate region at the selected row at the region of the selected column, (for a stored logic "1" bit) the unique row select signal applied to that gate region will render conductive the FET defined by the active adjacent source and drain regions and that gate region, and conduction is thus effected between those two adjacent channels. In this manner bus **58*a* is connected through the conducting FET's in the adjacent channels in the upper and column select circuits, and the FET defined by these channels and the active gate region in the matrix, to the output bus 60***a*, and bus 60*a* is charged to a negative potential reflecting and the stored logic "1" bit at the selected address location.

On the other hand if there is no operative FET gate region defined at the selected row-column intersection, the application of the negative row select signal would not be effective to cause conduction between the two adjacent conducting channels receiving the uniquely negative column select signal, so that output bus 60*a* remains at its precharged ground level reflecting the stored logic "0" signal at the selected address location.

To further illustrate the operation of the memory assume that the selected address location contains a logic "1" bit and is located at the intersection of row 1 and column 1. The $x_1$ and $y_1$column and row select signals are thus uniquely negative. As a result FET's Q2 and Q10 are rendered conductive and a conductive path between buses 58*a* and 60*a* is formed through the upper portion of channel 40*a*, the output circuit of FET Q2, between channels 40*a* and 42*a* as a result of the conductive FET formed in the matrix at the row 1--column 1intersection, the lower portion of channel 42*a*, and the output circuit of FET Q10.

The signal level at bus 60*a* which is either negative or at ground during $\phi 3$ time, thus reflects the logic level stored at the selected address location, as is desired. It will be understood that the operation of memory section 12*b* is the same as that of section 12*a*. Corresponding circuit elements in the latter are designated by numerals corresponding to those in the former but have the subscript *b* applied thereto.

The output circuits of FET's Q18*a* and Q18*b* are connected respectively to buses 60*a* and 60*b* and the negative VDD supply. The gates of these FET's receive the section select signal C or its complement $\bar{C}$ depending on which section is to be selected, which is in turn determined by the sense of the input section select signal C. FET's Q18*a* and Q18*b* thus define the section select circuits 30*a* and 30*b* in FIG. 1. For the unselected section in the section select signal applied to the gate of FET Q18 is negative so that at all times that FET is conducting and the output bus of that section is negative. For the selected memory section, the select signal applied to the gate of FET Q18 is at ground level, that FET is nonconductive, and its output bus is charged during $\phi 3$ time either negative or to ground in accord with the stored logic signal read out from that section as described above.

Bus 60*a* connected to the gate of FET Q19, the source of which is connected to the input of amplifier 14. Similarly the gate of FET Q20 is connected to bus 60*b* and its source is connected to bus 60*a*. The drain of FET Q20 is connected to that of FET Q19 at a point 58 and thus to the input of amplifier 14. FET Q21 has its output circuit connected between input point 58 and ground and has the output format select signal Z1 applied to its gate. When that signal is negative in accord with the nature of the format select signals D1–D3, the input to amplifier 14 is unconditionally tied to ground and its output is at a corresponding predetermined level.

If it is desired to read out a stored data signal form memory section 12*a*, bus 60*b* is at a negative potential and bus 60*a* at $\phi 3$ time is at a level conditioned by the stored logic signal at the selected address location. The negative potential at bus 60*b* rapidly turns on FET Q20 and thus connects bus 60*a* through its conducting output circuit to the input of amplifier 14. At the same time, however, if there is a negative potential at bus 60*a* resulting from a read out logic "1" signal, FET Q19 is also conductive and thus causes conduction between bus 60*b* and point 58, the input to amplifier 14. Thus, for a negative or logic "1" signal at the output bus of the selected memory section, current is supplied to the input of amplifier 14 from the output buses of both the selected and unselected memory sections, thereby increasing the rate at which the amplifier responds to the read out signal at the output bus of the selected memory section. For a readout of a logic "0" signal from section 12*a*, bus 60*a* is at ground, FET Q19 remains off, and point 58 is connected through the conducting output circuit of FET Q20 to bus 60*a* which is then at ground. The input to amplifier 14 is a ground level signal and that amplifier produces a corresponding output signal at line 16.

The operation of the memory when memory section 12*b* is selected for a readout operation is similar to that described above for a readout operation on section 12*a*. FET Q18*a* is rendered conductive by the signal at its gate, and bus 60*a* is charged to a highly negative potential. That negative potential renders FET Q19 conductive so that bus 60*b* which is at a level corresponding to the readout logic signal is connected through the output circuit of FET Q19 to the input of amplifier 14. For a negative logic signal at bus 60*b*, FET Q20 along with FET Q19 is conductive thus supplying increased current from the output buses of both memory sections to the input of amplifier 14. This, as described above, increases the rate at which amplifier 14 responds to the derived data signal at the selected memory section, particularly for a readout of a logic "1" signal.

In the fabrication of the memory matrices, it has been found that as a result of imperfections, there may be leakage or noise current flowing between adjacent channels at the location of the addressed row even if there is no active gate region intended to be formed thereat. That leakage current may be sufficiently large in some cases to exceed the threshold level of FET's Q19 or Q20, and will thus produce an erroneous output signal at line 16. In the memory of the present invention the possibility of deriving an incorrect output logic signal in this manner is substantially prevented by providing current bypass means in the form of FET's Q22 and Q23 which have their output circuits respectively connected between output buses 60*a* and 60*b* and ground.

The source and gate of these FET's are both connected to their respective output bus, and their drains are each connected to ground. When bus 60*a* and 60*b* goes negative FET's Q22 and Q23 are rendered conductive and serve to bypass to ground through their output circuits, a limited amount of current. For a correct negative signal at the bus, that is for a logic "1" readout, the current bypassed in this manner is insufficient to prevent the negative signal on the output bus from causing FET Q19 (or Q20) to be conductive as desired.

However, when the bus is negative as a result of leakage or noise current during a logic "0" readout operation, a sufficient amount of current is bypassed through the appropriate bypass FET, thus preventing that negative signal from erroneously being applied to amplifier 14 through the switching FET Q19 (or Q20).

The memory of the present invention is less sensitive to residual or leakage current and may thus be fabricated at reduced tolerances and at reduced costs, without the sacrifice of accuracy and reliability.

Figure 4:
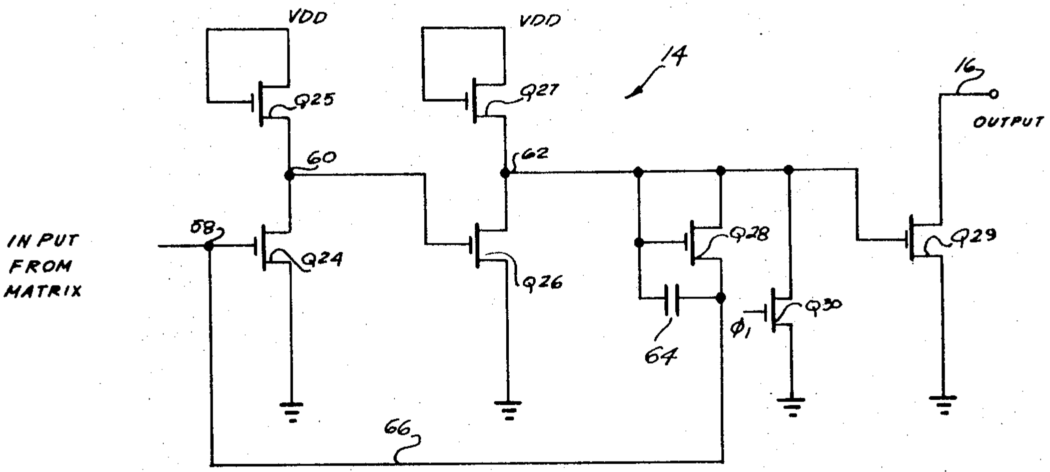
FIG. 4 is a schematic diagram of a typical output amplifier for use in the memory of FIG. 1.

FIG. 4 illustrates a preferred circuit of an output amplifier which may be used to advantage in the read-only memory of the invention. That amplifier comprises FET Q24 and the gate of which is connected to input point 58. The source-drain circuit of FET Q24 is connected between a junction point 60 and ground, that point being defined at the intersection of the output circuits of FET Q24 and FET Q25. The gate and source of the latter device are each tied to the negative VDD supply.

Point 60 is connected to the gate of FET Q26 the output circuit of which is connected between a point 62 and ground, that point being defined at the junction of the output circuits of FET Q26 and FET Q27. The gate and source of FET Q27 are both tied to the VDD supply.

Point 62 in turn is connected to the gate and source of FET Q28. The gate of FET Q28 is connected through a capacitor 64 to the drain of that device. The drain of FET Q28 is also connected by a line 66 to input point 58. Point 62 is further connected to the gate of FET Q29, the source of which is connected to output line 16, and to the source of FET Q30, the gate of which receives the $\phi 1$ clock. The drains of FET's Q29 and Q30 are each connected to ground.

The two input FET pairs of FET's Q24 and Q25, and FET's Q26 and Q27 act as inverters of the input signal at point 58. A negative signal at point 62 corresponding to an input logic "1" signal, causes FET's Q28 and Q29 to be conductive, thereby to cause output line 16 to be charged to ground through the output circuit of the latter. That negative signal is also fed back through the output circuit of FET Q28 and capacitor 64 to line 66 and point 58. For a ground (logic "0") signal at point 62, FET Q29 is nonconductive so that a substantially open circuit is presented at output line 16. During $\phi 1$ time, when output buses 60*a* and 60*b* are tied to ground, FET Q30 conducts to place an unconditional ground signal at the gate of FET Q29, thereby presenting an unconditional open circuit at output line 16 at that time.

The read-only memory of the present invention thus provides increased storage capacity while still operating at an increased rate of retrieval or data readout. It accomplishes the latter feature by utilizing the negatively charged output bus of the unselected memory section to actuate a switching device to connect the output bus of the selected memory section to the output amplifier. At the same time a second switching device connected to the unselected memory section and controlled by the signal level at the selected memory section is actuated for a read out logic "1" signal. This has the effect of increasing the rate of current flow to the output amplifier and thus increases the rate of readout of the stored logic "1" signal.

By the connection of a current bypass device to the output bus of each memory section, improper actuation of the output device due to noise or leakage current or the like is prevented, thereby increasing the accuracy and reliability of the memory without increasing its manufacturing costs.

While only a single embodiment of the invention has been herein specifically described, it is to be understood that many modifications may be made therein without departing from the spirit and scope of the invention.

We claim:

1. A read-only memory comprising first and second sections each having data selectively stored in a plurality of address locations therein and each having an output line, means for addressing an address location in each of said sections for developing a logic signal at said output line corresponding to the data respectively stored at the addressed locations, means for selecting one of said sections and for placing the output line of the other of said sections at a reference potential, an output circuit, first switch means controlled by the reference potential at said other of said sections and effective when actuated thereby to operatively connect said one of said sections to said output circuit, and second switch means controlled by the data signal at the output line of the selected section, and effective when actuated thereby to operatively connect said other of said sections to said output circuit.

2. The memory of claim 1, further comprising current bypass means operatively connected to the output lines of each of said sections for preventing the formation of an incorrect logic signal at said output circuit due to leakage current in said selected memory section.

3. The memory of claim 2, in which said bypass means comprise third and fourth switch means having a control terminal connected respectively to the output lines of said first and second sections and an output terminal connected to ground.

4. The memory of claim 1, in which said first and second switch means each comprises a control terminal connected to the output line of one of said first and second sections and an output terminal connected between the output line of the other of said sections and said output circuit.

5. The memory of claim 4, in which said output circuit comprises an amplifier having an input terminal connected to an output terminal of said first and second switch means.

6. The memory of claim 4, further comprising current bypass means operatively connected to the output lines of each of said sections for preventing the formation of an incorrect logic signal at said output circuit due to leakage current in said selected memory section.